United States Patent
Lee et al.

(10) Patent No.: US 11,513,784 B2
(45) Date of Patent: Nov. 29, 2022

(54) SOFTWARE UPDATE DEVICE AND SOFTWARE UPDATE METHOD USING SAME

(71) Applicant: YURA CORPORATION CO., LTD., Seongnam-si (KR)

(72) Inventors: Do Kyeong Lee, Gwangju-si (KR); Dae Hwan Kwon, Seongnam-si (KR)

(73) Assignee: YURA CORPORATION CO., LTD., Seongnam-si (KR)

( * ) Notice: Subject to any disclaimer, the term of this patent is extended or adjusted under 35 U.S.C. 154(b) by 242 days.

(21) Appl. No.: 16/766,953

(22) PCT Filed: Dec. 20, 2018

(86) PCT No.: PCT/KR2018/016354
§ 371 (c)(1),
(2) Date: May 26, 2020

(87) PCT Pub. No.: WO2019/132422
PCT Pub. Date: Jul. 4, 2019

(65) Prior Publication Data
US 2021/0034351 A1 Feb. 4, 2021

(30) Foreign Application Priority Data

Dec. 29, 2017 (KR) .................. 10-2017-0184726

(51) Int. Cl.
*G06F 8/65* (2018.01)
*H04L 12/40* (2006.01)
(Continued)

(52) U.S. Cl.
CPC .............. *G06F 8/65* (2013.01); *H04L 12/40* (2013.01); *B60L 53/18* (2019.02); *G06F 9/445* (2013.01);
(Continued)

(58) Field of Classification Search
CPC . G06F 8/65; G06F 9/445; H04L 2012/40234; H04L 2012/40273; H04L 12/40; B60L 53/18
See application file for complete search history.

(56) References Cited

U.S. PATENT DOCUMENTS

2016/0031335 A1* 2/2016 Soden ............... H02J 7/0047
320/162
2017/0166198 A1* 6/2017 Jin ..................... F02D 41/30
(Continued)

FOREIGN PATENT DOCUMENTS

JP        2013-151222    8/2013
KR    10-2016-0046418    4/2016
(Continued)

OTHER PUBLICATIONS

International Search report, with English translation, corresponding to International Application No. PCT/KR2018/016354, dated Apr. 1, 2019.
(Continued)

*Primary Examiner* — Henry Tsai
*Assistant Examiner* — John B Roche
(74) *Attorney, Agent, or Firm* — Kile Park Reed & Houtteman PLLC (57) ABSTRACT

The present invention includes a CP monitoring unit configured to monitor a CP voltage applied through a CP line from the controller of the slow charging cable when the slow charging cable is connected to an inlet, a mode switching request unit configured to request mode switching to the controller of the slow charging cable by converting the monitored CP voltage to a preset mode switching voltage; a communication switching unit configured to connect a LIN transceiver for LIN communication to the CP line when the controller of the slow charging cable is switched to a LIN communication mode for software update, and a control unit
(Continued)

configured to control the LIN transceiver to transmit a pre-stored software update file to the controller of the slow charging cable, so that the controller's software can be updated without disassembling or damaging the controller of the slow charging cable.

13 Claims, 4 Drawing Sheets

(51) Int. Cl.
*B60L 53/18* (2019.01)
*G06F 9/445* (2018.01)
(52) U.S. Cl.
CPC ............... *H04L 2012/40234* (2013.01); *H04L 2012/40273* (2013.01)

(56) References Cited

U.S. PATENT DOCUMENTS

2019/0295332 A1\* 9/2019 Hwang ................. G07C 5/0808
2019/0359073 A1\* 11/2019 Song ....................... B60L 53/14

FOREIGN PATENT DOCUMENTS

| KR | 10-2016-0072982 | 6/2016 |
| KR | 10-1672956 | 11/2016 |

OTHER PUBLICATIONS

Extended European Search Report for European Application No./Patent No. 18897053.7, dated Jun. 14, 2021.

\* cited by examiner

SOFTWARE UPDATE DEVICE AND SOFTWARE UPDATE METHOD USING SAME

TECHNICAL FIELD

The present invention relates to a software update device and a software update method using the same.

BACKGROUND ART

In general, a controller (e.g., In Cable Control Box (ICCB)) provided in the slow charging cable is installed with software for performing control functions, and is provided to update the software through a debugger or a communication channel. The above-mentioned, software update using a debugger uses a Joint Test Action Group (JTAG) interface, and when using a communication channel, a communication channel such as Controller Area Network/Universal Asynchronous Receiver-Transmitter (CAN/UART) is used.

Moreover, since a controller provided in a conventional slow charging cable is assembled with an outer case fused or internally molded for waterproof, discharge, and the like, after the manufacturing is completed, the process of updating the software is very cumbersome.

That is, since the outer case needs to be broken or disassembled to update software, and must be reassembled with the controller provided in the conventional slow charging cable after the software update is completed, the software update process is very cumbersome, and a situation may occur in which a Printed Circuit Board (PCB) or electronic components inside the controller may be damaged.

In addition, when product damage occurs in the process of updating the software of the controller provided in the conventional slow charging cable, there is a problem that the controller itself needs to be replaced.

In order to solve this problem, a mobile xEV charger has been developed that mounts a wireless communication module to a controller provided in a conventional slow charging cable and updates software through wireless communication, but the manufacturing cost is greatly increased due to the installation of the wireless communication module and there is a problem that the product size is limited due to the complicated internal circuit structure and antenna installation.

Accordingly, there is a need to develop a technology that can provide a simple circuit structure and minimize the increase in manufacturing cost while performing software update without disassembling or damaging the controller provided in the slow charging cable.

DISCLOSURE OF THE INVENTION

Technical Problem

The present invention was devised in consideration of the above problems, and an object of the present invention is to provide a software update device capable of updating software in connection to an outlet of a slow charging cable without disassembling or damaging the controller of the slow charging cable and a software update method using the same.

The objects of the present invention are not limited to the above-mentioned objects, and other objects not mentioned may be clearly understood by those skilled in the art from the following description.

Technical Solution

The present invention for achieving the above object provides a software update device including: an inlet 110 to which an outlet of a slow charging cable is connected, a Control Pilot (CP) monitoring unit 120 configured to monitor a CP voltage applied through a CP line from the controller 10 of the slow charging cable when the slow charging cable is connected to the inlet 110, a mode switching request unit 130 configured to request mode switching to the controller 10 of the slow charging cable by converting the monitored CP voltage to a preset mode switching voltage, a communication switching unit 140 configured to connect a Local Interconnect Network (LIN) transceiver 145 for LIN communication to the CP line when the controller 10 of the slow charging cable is switched to a LIN communication mode for software update, and a control unit 150 configured to control the LIN transceiver 145 to transmit a pre-stored software update file to the controller 10 of the slow charging cable.

In a preferred embodiment, the mode switching request unit 130 is a switch of which an input terminal is connected to the CP line and of which an output terminal is connected to a resistor and ground.

In a preferred embodiment, the mode switching request unit 130 is turned on/off under the control of the control unit 150, and is provided to lower the CP voltage of the CP line to a mode switching voltage by resistor when turned on.

In a preferred embodiment, the communication switching unit 140 is a switch of which an input terminal is connected to the CP line and of which an output terminal is connected to a LIN transceiver 145.

In a preferred embodiment, the communication, when the LIN transceiver 145 is connected to the CP line, the control unit 150 requests the version of the software installed in the controller 10 of the slow charging cable through the LIN transceiver 145, and if it is confirmed that the previous version of the software is installed in the controller 10 of the slow charging cable, the control unit 150 transmits an update start message to the controller 10 of the slow charging cable, and if a normal response is received from the controller 10 of the slow charging cable, the control unit 150 transmits a software update file to the controller 10 of the slow charging cable.

In a preferred embodiment, the software update device may further include a communication unit 160 for receiving a file for software update in communication with an external device including a smart phone and a personal computer.

In a preferred embodiment, the communication unit 160 receives a file for software update through wired communication including Universal Serial Bus (USB) communication and serial communication, or receives a file for software updates through wireless communication including Bluetooth, Wi-Fi, and Near Field Communication (NFC).

In a preferred embodiment, the controller 10 of the slow charging cable includes: a CP driver 11 configured to apply a CP voltage through the CP line; a LIN transceiver 12 for LIN communication; and a switch 13 disposed on the CP line and selectively connected to any one of the input terminal of the CP driver 11 and the input terminal of the LIN transceiver 12, wherein when a mode switching request for updating software is recognized through a mode switching voltage, the controller 10 of the slow charging cable connects the switch 13 connected to the input terminal of the CP driver 11 to the LIN transceiver 12 so as to switch to a LIN communication mode for software update.

In addition, the present invention provides a software update method performed in a software update device, the method including: (1) monitoring, by a Control Pilot (CP) monitoring unit, a CP voltage applied through a CP line from a controller 10 of a slow charging cable connected to an inlet; (2) requesting, by a mode switching request unit, mode switching to the controller of the slow charging cable by converting the monitored CP voltage to a preset mode switching voltage; (3) connecting, by a communication switching unit, a Local Interconnect Network (LIN) transceiver for LIN communication to the CP line when the controller of the slow charging cable is switched to a LIN communication mode for software update; and (4) controlling, by a control unit, the LIN transceiver to transmit a pre-stored software update file to the controller of the slow charging cable.

In a preferred embodiment, in step (2), the mode switching request unit is a switch of which an input terminal is connected to the CP line and of which an output terminal is connected to a resistor and ground.

In a preferred embodiment, in step (2), the mode switching request unit is turned on/off under the control of the control unit 150, and is provided to lower the CP voltage of the CP line to a mode switching voltage by resistor when turned on.

In a preferred embodiment, in step (3), the communication switching unit is a switch of which an input terminal is connected to the CP line and of which an output terminal is connected to a LIN transceiver.

In a preferred embodiment, in step (4), when the LIN transceiver is connected to the CP line, the control unit requests the version of the software installed in the controller of the slow charging cable through the LIN transceiver, and if it is confirmed that the previous version of the software is installed in the controller of the slow charging cable, the control unit transmits an update start message to the controller of the slow charging cable, and if a normal response is received from the controller of the slow charging cable, the control unit transmits a software update file to the controller 10 of the slow charging cable.

In a preferred embodiment, the method further includes, before step (1), (A) receiving, by a communication unit, a file for software update in communication with an external device including a smart phone and a personal computer.

In a preferred embodiment, in step (A), the communication unit receives a file for software update through wired communication including Universal Serial Bus (USB) communication and serial communication, or receives a file for software updates through wireless communication including Bluetooth, Wi-Fi, and Near Field Communication (NFC).

Advantageous Effects

According to the above-described problem solving means, the present invention includes a CP monitoring unit configured to monitor a CP voltage applied through a CP line from the controller of the slow charging cable when the slow charging cable is connected to an inlet, a mode switching request unit configured to request mode switching to the controller of the slow charging cable by converting the monitored CP voltage to a preset mode switching voltage; a communication switching unit configured to connect a LIN transceiver for LIN communication to the CP line when the controller of the slow charging cable is switched to a LIN communication mode for software update, and a control unit configured to control the LIN transceiver to transmit a pre-stored software update file to the controller of the slow charging cable, so that the controller's software can be updated without disassembling or damaging the controller of the slow charging cable.

MODE FOR CARRYING OUT THE INVENTION

In the following description, specific details of the present invention are set forth in order to provide a more thorough understanding of the present invention, and it will be apparent to those skilled in the art that the present invention is easily implemented without these specific details and with modifications thereto.

Hereinafter, preferred embodiments of the present invention will be described in detail with reference to FIGS. 1 to 4, and the description is given on the parts necessary for understanding the operations and functions according to the present invention.

Figure 1:
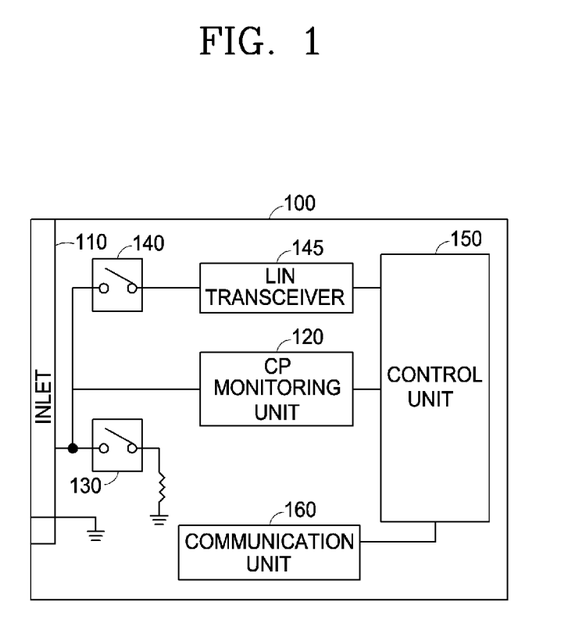
FIG. 1 is a view for explaining a software update device according to an embodiment of the present invention.
Figure 2:
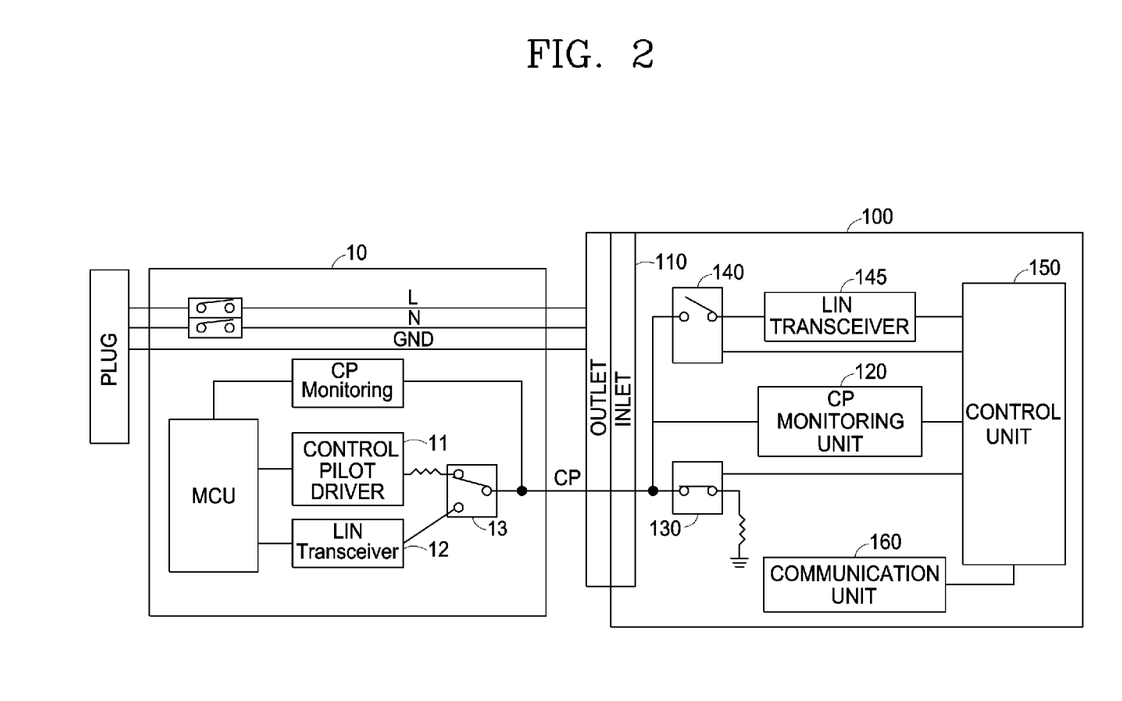
FIG. 2 is a view for explaining an operation state for a mode switching request in a software update device.
Figure 3:
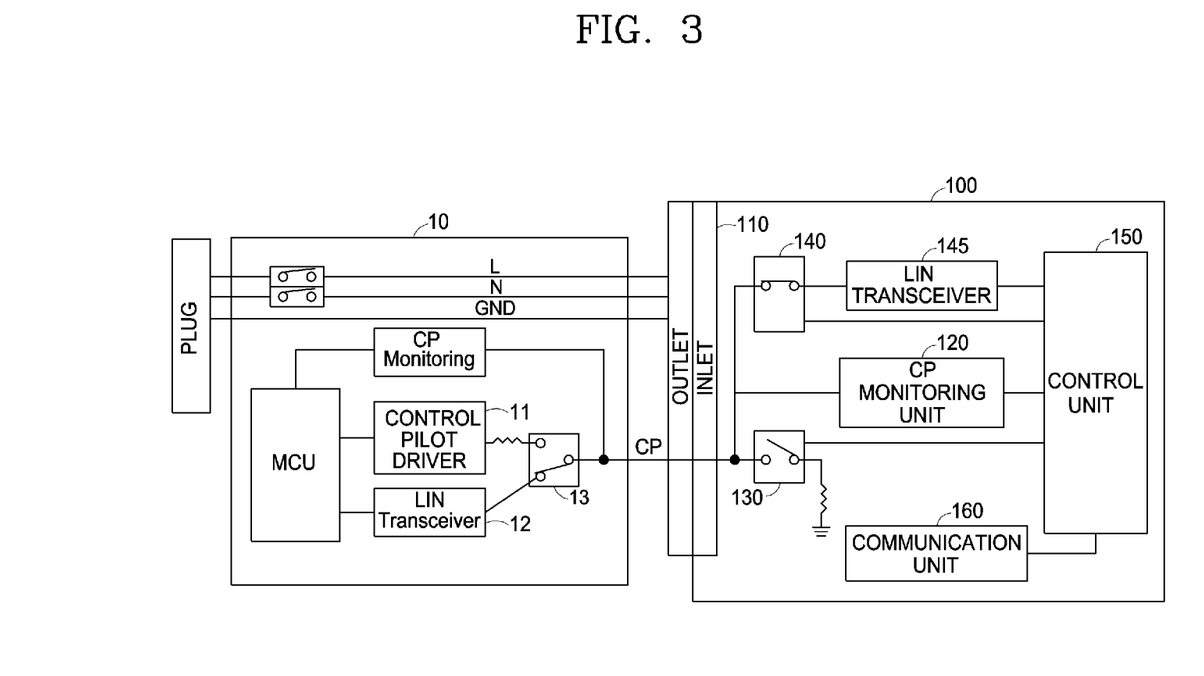
FIG. 3 is a view for explaining an operation state for transmitting a file for software update in a software update device.

FIG. 1 is a view for explaining a software update device according to an embodiment of the present invention, FIG. 2 is a view for explaining an operation state for a mode switching request in a software update device, and FIG. 3 is a view for explaining an operation state for transmission of a file for software update in a software update device.

Referring to FIGS. 1 to 3, a software update device 100 according to an embodiment of the present invention includes an inlet 110, a CP monitoring unit 120, a mode switching request unit 130, a communication switching unit 140, a control unit 150, and a communication unit 160.

The inlet 110 is for connecting the slow charging cable, and is provided so that the outlet of the slow charging cable can be connected. The inlet 110 may be provided with a CONTROL PILOT (CP) terminal to which a CP line of the slow charging cable is connected.

The CP monitoring unit 120 is for monitoring CP voltage, and when the slow charging cable is connected to the inlet 110, the CP monitoring unit 120 monitors the CP voltage applied through the CP line from the controller 10 of the slow charging cable.

That is, the CP monitoring unit 120 allows the control unit 150, which will be described later, to check whether a slow charging cable is connected. In addition, the CP monitoring unit 120 may monitor the voltage of the CP line changed by the mode switching request unit 130, which will be described later.

The mode switching request unit 130 is for requesting mode switching to the controller 10 of the slow charging cable, and performs a function of converting the CP voltage to a preset mode switching voltage. The mode switching request unit 130 is provided with a switch having a CP line connected to the input terminal and a resistor and ground formed on the output terminal, and may be provided to be turned on/off under the control of the control unit 150 to be described later.

In addition, as shown in FIG. 2, when the mode switching request unit 130 is turned on, the CP voltage of the CP line is lowered to the mode switching voltage by resistor. At this time, the controller 10 of the slow charging cable is also provided therein and disposed on the CP line, and a switch 13 selectively connected to one of the input terminal of the CP driver 11 and the input terminal of the LIN transceiver 12 may be connected to a CONTROL PILOT (CP) driver 11.

That is, the voltage of the CP line drops to the mode switching voltage by the resistor connected to the output terminal of the mode switching request unit 130 and the resistor connected to the input terminal of the CP driver 11 inside the controller 10 of the slow charging cable.

Moreover, the controller 10 of the slow charging cable recognizes a mode switching request for updating the software through a mode switching voltage, and connects the switch 13 connected to the input terminal of the CP driver 11 to the LIN Transceiver 12 such that it will switch to Local Interconnect Network (LIN) communication mode for software update.

When the controller 10 of the slow charging cable is switched to the LIN communication mode for software update, the communication switching unit 140 performs a function of connecting the LIN transceiver 145 for LIN communication to the CP line.

For example, as shown in FIG. 3, the communication switching unit 140 may be provided as a switch in which a CP line is connected to an input terminal and the LIN transceiver 145 is connected to an output terminal, and as turned on under the control of the control unit 150 to be described later, the communication switching unit 140 allows the LIN transceiver 145 and the LIN transceiver inside the controller 10 of the slow charging cable to be connected to each other.

That is, the software update file can be transmitted to the controller 10 of the slow charging cable.

The control unit 150 is to control the overall device, and in particular, controls the LIN transceiver 145 to transmit a pre-stored software update file to the controller 10 of the slow charging cable. In addition, the control unit 150 may perform a function of turning on/off the mode switching request unit 130 and the communication switching unit 140.

Also, when the LIN transceiver 145 is connected to the CP line, first, the control unit 150 requests the version of the software installed on the controller 10 of the slow charging cable through the LIN transceiver 145. If it is confirmed that the previous version of the software is installed in the controller 10 of the slow charging cable, the control unit 150 transmits an update start message to the controller 10 of the slow charging cable, and if a normal response is received from the controller 10 of the slow charging cable, the control unit 150 may update the software installed in the controller 10 of the slow charging cable by performing a process of transmitting the file for software update to the controller 10 of the slow charging cable.

Then, the control unit 150 may request again checking the version of the software installed in the controller 10 of the slow charging cable and check whether the new version of the software is normally installed.

The communication unit 160 is for receiving a file for software update by communicating with an external device including a smart phone and a personal computer, and may be provided to receive a file for software update through wired communication including Universal Serial Bus (USB) communication and serial communication, or to receive a file for software update through wireless communication including Bluetooth, Wi-Fi, and Near Field Communication (NFC).

Furthermore, the software update file received by the communication unit 160 may be stored in a memory provided in the control unit 150 or may be stored in a separately provided memory or storage means.

Therefore, the software update device 100 according to an embodiment of the present invention transmits a software update file to the controller 10 of the slow charging cable through the CP line such that it is possible to update the software of the corresponding controller 10 without disassembling or damaging the controller 10 of the slow charging cable.

Figure 4:
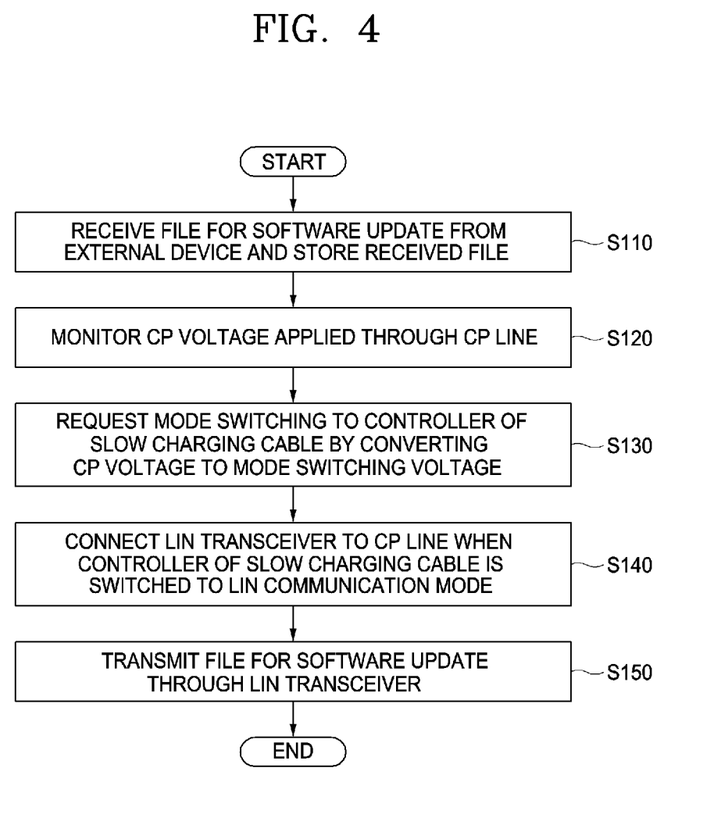
FIG. 4 is a view for explaining a software update method according to an embodiment of the present invention.

FIG. 4 is a view for explaining a software update method according to an embodiment of the present invention.

Referring to FIG. 4, a software update method performed in a software update device according to an embodiment of the present invention will be described.

However, since the functions performed in the software update method illustrated in FIG. 4 are all performed in the software update device described with reference to FIGS. 1 to 3, even without an explicit description, all functions described with reference to FIGS. 1 to 3 are performed in a software update method according to a preferred embodiment of the present invention, and it should be noted that all functions described with reference to FIG. 4 are performed as they are in a software update device according to a preferred embodiment of the present invention.

First, the communication unit communicates with an external device including a smartphone and a personal computer to receive a file for software update (S110).

At this time, the software update file received from the communication unit may be stored in a memory provided in the control unit or may be stored in a separately provided memory or storage means.

In addition, the communication unit may receive a file for software update through wired communication including Universal Serial Bus (USB) communication and serial communication, or receive a file for software update through wireless communication including Bluetooth, Wi-Fi, and Near Field Communication (NFC).

Next, the CP monitoring unit monitors the CP voltage applied through the CONTROL PILOT (CP) line from the controller of the slow charging cable connected to the inlet (S120).

At this time, depending on whether the CP voltage is monitored, it can be determined whether the outlet of the slow charging cable is connected to the inlet of the software update device.

Then, the mode switching request unit converts the CP voltage to a preset mode switching voltage to request mode switching to the controller of the slow charging cable (S130).

At this time, the mode switching request unit is provided as a switch which is turned on/off under the control of the control unit and of which the input terminal is connected to the CP line and of which the output terminal is connected to resistor and ground. When it becomes an on state, the CP voltage of the CP line can be reduced to a mode switching voltage by a resistor.

Next, the communication switching unit connects the Local Interconnect Network (LIN) transceiver for LIN communication to the CP line (S140).

At this time, the controller of the slow charging cable is switched to the LIN communication mode for software update according to the mode switching request, and as the LIN transceiver is connected to the CP line by the communication switching unit, data transmission and reception is possible through LIN communication with the controller of the slow charging cable.

For this, the communication switching unit may be provided as a switch in which a CP line is connected to the input terminal and a LIN transceiver is connected to the output terminal.

Then, the control unit transmits a pre-stored software update file through the LIN transceiver to the controller of the slow charging cable (S150).

At this time, when the LIN transceiver is connected to the CP line, the control unit can request the version of the software installed in the controller of the slow charging cable through the LIN transceiver, and confirm that the previous version of the software is installed in the controller of the slow charging cable.

In addition, when the control unit transmits an update start message to the controller of the slow charging cable and receives a normal response from the controller of the slow charging cable, the software update file can be transmitted to the controller of the slow charging cable.

In addition, after the control unit transmits the software update file to the controller of the slow charging cable, and after the software update is completed by the controller of the slow charging cable, the controller of the slow charging cable may be requested again to check the version of the software, and it may be confirmed whether the new version of the software is properly installed.

While the preferred embodiments of the present invention are described exemplarily, the scope of the present invention is not limited to these specific embodiments and is appropriately changed within the scope of the claims.

INDUSTRIAL APPLICABILITY

The present invention can provide a software update device and a software update method capable of performing software update without disassembling or damaging the controller provided in the slow charging cable.

The invention claimed is:

1. A software update device comprising:
   an inlet to which an outlet of a slow charging cable is connected;
   a Control Pilot (CP) monitoring unit configured to monitor a CP voltage applied through a CP line from a controller of the slow charging cable when the slow charging cable is connected to the inlet;
   a mode switching request unit configured to request mode switching to the controller of the slow charging cable by converting the monitored CP voltage to a preset mode switching voltage;
   a communication switching unit configured to connect a Local Interconnect Network (LIN) transceiver for LIN communication to the CP line when the controller of the slow charging cable is switched to a LIN communication mode for a software update; and
   a control unit configured to control the LIN transceiver to transmit a pre-stored software update file to the controller of the slow charging cable,
   wherein the mode switching request unit is a switch of which an input terminal is connected to the CP line and of which an output terminal is connected to a resistor and ground.

2. The software update device of claim 1, wherein the mode switching request unit is turned on/off under control of the control unit, and is provided to lower the CP voltage of the CP line to a mode switching voltage by the resistor when turned on.

3. The software update device of claim 1, wherein the communication switching unit is a switch of which an input terminal is connected to the CP line and of which an output terminal is connected to a LIN transceiver.

4. The software update device of claim 1, wherein when the LIN transceiver is connected to the CP line, the control unit requests a version of a software installed in the controller of the slow charging cable through the LIN transceiver, and if it is confirmed that a previous version of the software is installed in the controller of the slow charging cable, the control unit transmits an update start message to the controller of the slow charging cable, and if a normal response is received from the controller of the slow charging cable, the control unit transmits a software update file to the controller of the slow charging cable.

5. The software update device of claim 1, further comprising a communication unit for receiving a file for the software update in communication with an external device including a smart phone and a personal computer.

6. The software update device of claim 5, wherein the communication unit receives a file for the software update through wired communication including Universal Serial Bus (USB) communication and serial communication, or receives a file for the software update through wireless communication including Bluetooth, Wi-Fi, and Near Field Communication (NFC).

7. The software update device of claim 1, wherein the controller of the slow charging cable comprises:
   a CP driver configured to apply a CP voltage through the CP line;
   a LIN transceiver for LIN communication; and
   a switch disposed on the CP line and selectively connected to any one of the input terminal of the CP driver and the input terminal of the LIN transceiver,
   wherein when a mode switching request for updating software is recognized through a mode switching voltage, the controller of the slow charging cable connects the switch connected to the input terminal of the CP driver to the LIN transceiver so as to switch to a LIN communication mode for the software update.

8. A software update method performed in a software update device, the method comprising:
   monitoring, by a Control Pilot (CP) monitoring unit, a CP voltage applied through a CP line from a controller of a slow charging cable connected to an inlet;
   requesting, by a mode switching request unit, mode switching to the controller of the slow charging cable by converting the monitored CP voltage to a preset mode switching voltage;
   connecting, by a communication switching unit, a Local Interconnect Network (LIN) transceiver for LIN communication to the CP line when the controller of the slow charging cable is switched to a LIN communication mode for software update; and
   controlling, by a control unit, the LIN transceiver to transmit a pre-stored software update file to the controller of the slow charging cable,
   wherein in the requesting of the mode switching, the mode switching request unit is a switch of which an input terminal is connected to the CP line and of which an output terminal is connected to a resistor and ground.

9. The method of claim 8, wherein in the requesting of the mode switching, the mode switching request unit is turned on/off under control of the control unit, and is provided to lower the CP voltage of the CP line to a mode switching voltage by the resistor when turned on.

10. The method of claim 8, wherein in the connecting of the LIN transceiver, the communication switching unit is a switch of which an input terminal is connected to the CP line and of which an output terminal is connected to a LIN transceiver.

11. The method of claim 8, wherein in the controlling of the LIN transceiver, when the LIN transceiver is connected to the CP line, the control unit requests a version of a software installed in the controller of the slow charging cable through the LIN transceiver, and if it is confirmed that a previous version of the software is installed in the controller of the slow charging cable, the control unit transmits an update start message to the controller of the slow charging cable, and if a normal response is received from the controller of the slow charging cable, the control unit transmits a software update file to the controller of the slow charging cable.

12. The method of claim 8, further comprising, before the monitioring of the CP voltage, receiving, by a communication unit, a file for the software update in communication with an external device including a smart phone and a personal computer.

13. The method of claim 12, wherein in the receiving of the file, the communication unit receives a file for the software update through wired communication including Universal Serial Bus (USB) communication and serial communication, or receives a file for the software update through wireless communication including Bluetooth, Wi-Fi, and Near Field Communication (NFC).

\* \* \* \* \*